(12) United States Patent
Xiong et al.

(10) Patent No.: US 11,231,781 B2
(45) Date of Patent: Jan. 25, 2022

(54) HAPTIC GLOVES FOR VIRTUAL REALITY SYSTEMS AND METHODS OF CONTROLLING THE SAME

(71) Applicant: Intel Corporation, Santa Clara, CA (US)

(72) Inventors: Yuan Xiong, Shanghai (CN); Feiyue Zhai, Shanghai (CN); Buddy Cao, Shanghai (CN); Wenlong Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/627,606

(22) PCT Filed: Aug. 3, 2017

(86) PCT No.: PCT/CN2017/095846
§ 371 (c)(1),
(2) Date: Dec. 30, 2019

(87) PCT Pub. No.: WO2019/024051
PCT Pub. Date: Feb. 7, 2019

(65) Prior Publication Data
US 2020/0142490 A1 May 7, 2020

(51) Int. Cl.
*G06F 3/01* (2006.01)
(52) U.S. Cl.
CPC .............. *G06F 3/016* (2013.01); *G06F 3/014* (2013.01)

(58) Field of Classification Search
CPC .......... G06F 3/011; G06F 3/014; G06F 3/016; G06F 3/0346
See application file for complete search history.

(56) References Cited

U.S. PATENT DOCUMENTS

| 9,367,651 | B2 | 6/2016 | Algreatly | |
|---|---|---|---|---|
| 9,402,582 | B1* | 8/2016 | Parviz | A61B 5/02055 |
| 2005/0143679 | A1* | 6/2005 | Gelber | A61H 7/005 601/15 |
| 2014/0125577 | A1* | 5/2014 | Hoang | G06F 3/04815 345/156 |
| 2016/0059412 | A1* | 3/2016 | Oleynik | B25J 19/02 700/257 |

(Continued)

FOREIGN PATENT DOCUMENTS

| CN | 205318322 | 6/2016 |
|---|---|---|
| CN | 106575161 | 4/2017 |
| WO | 2016120805 | 8/2016 |

OTHER PUBLICATIONS

International Searching Aurthority, "International Search Report and Written Opinion", issued in connection with application No. PCT/CN2017/095846 dated May 3, 2018, 9 pages.

(Continued)

*Primary Examiner* — Nelson M Rosario
(74) *Attorney, Agent, or Firm* — Hanley, Flight & Zimmerman, LLC

(57) ABSTRACT

Example haptic gloves for virtual reality systems and related methods are disclosed herein. An example apparatus disclosed herein includes a glove to be worn on a hand of a user, an ultrasonic array disposed on an inner surface of the glove, and a control unit to activate the ultrasonic array device to generate haptic feedback on the hand of the user.

20 Claims, 6 Drawing Sheets

(56) References Cited

U.S. PATENT DOCUMENTS

2016/0296838 A1   10/2016  Goetgeluk et al.
2016/0363997 A1*  12/2016  Black .................... G06F 3/016
2017/0038897 A1*   2/2017  Park ..................... G06F 3/046
2017/0131775 A1*   5/2017  Clements .............. A63F 13/285
2017/0168576 A1*   6/2017  Keller ................... G06F 3/016

OTHER PUBLICATIONS

Patent Cooperation Treaty, "International Preliminary Report on Patentability", issued in connection with application No. PCT/CN2017/095846 dated Feb. 4, 2020, 5 pages.

Blenkinsopp, "Creating Haptic Feedback in VR—The Technology behind Ultrahaptics" aixr.org, The Academy of International Extended Reality, Mar. 22, 2019, 9 pages. [retrieved from the Internet https://aixr.org/insights/creating-haptic-feedback-in-vr-the-technology-behind-ultrahaptics/].

BristollG lab, "Rendering Volumetric Haptic Shapes in Mid-Air using Ultrasound," youtube.com, Nov. 21, 2014, 5 pages. [retreived from the Internet https://www.youtube.com/watch?v=kaoO5cY1aHk].

Iwamoto et al., "Airborne Ultrasound Tactile Display" Immersion, Cybertouch, 2007, 1 page. [retreived from the Internet https://citeseerx.ist.psu.edu/viewdoc/download?doi=10.1.1.561.2512&rep=rep1&type=pdf].

* cited by examiner

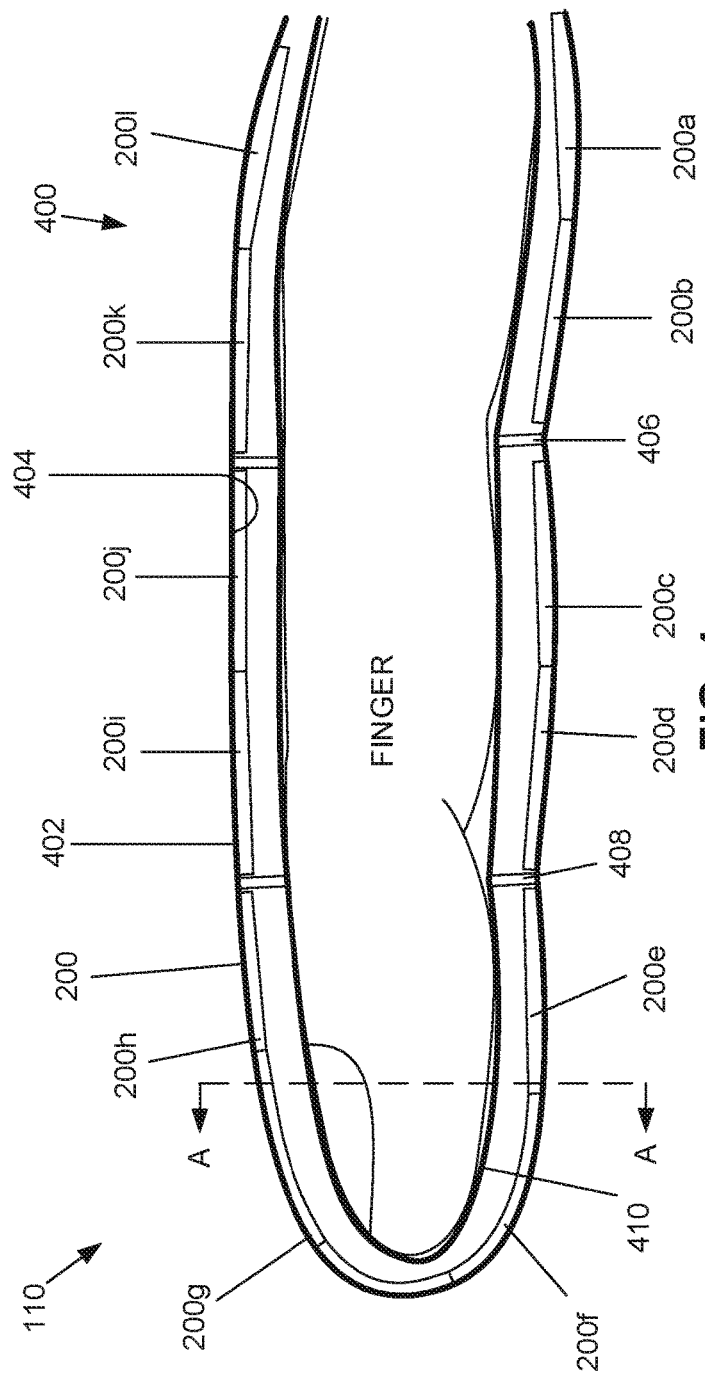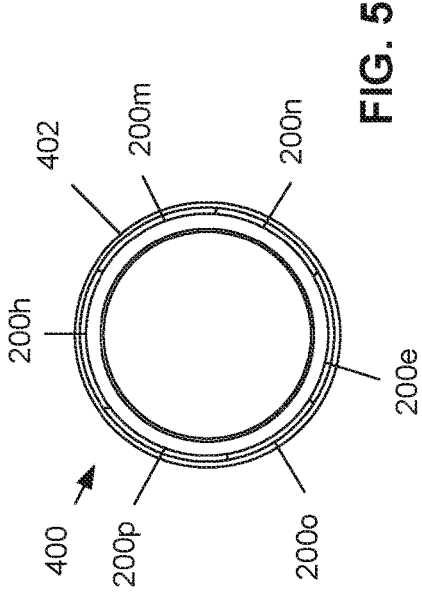

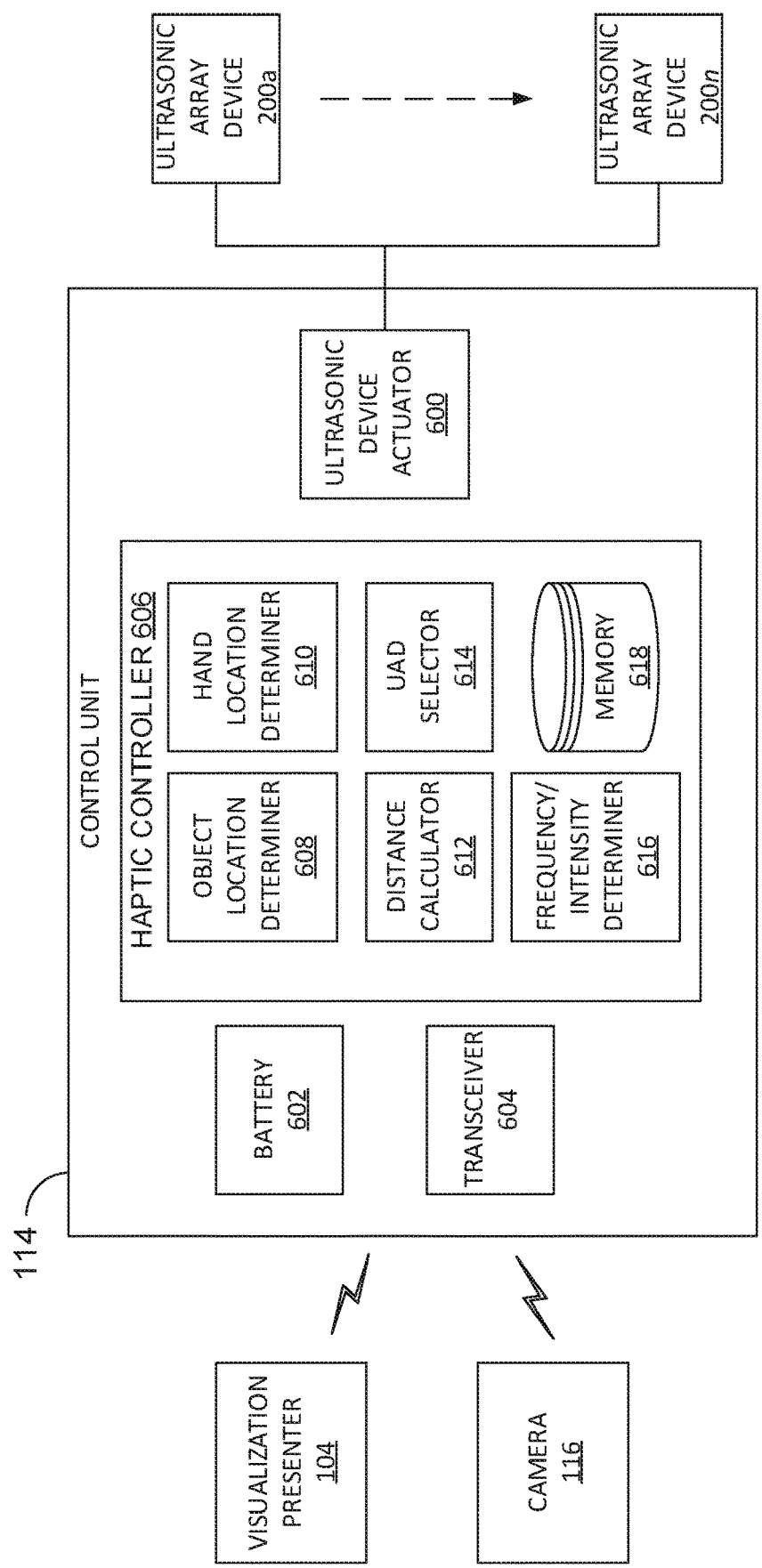

HAPTIC GLOVES FOR VIRTUAL REALITY SYSTEMS AND METHODS OF CONTROLLING THE SAME

FIELD OF THE DISCLOSURE

This disclosure relates generally to virtual reality systems and, more particularly, to haptic gloves for virtual reality systems and methods of controlling the same.

BACKGROUND

A virtual reality (VR) environment is a digital representation of an environment (e.g., a real or imaginary environment). A VR environment can be created using audio content and/or visual content. The VR environment can be displayed or presented to a user in any number of ways, for example, via a computer monitor, a virtual reality head-mounted device, speakers, etc. Some VR environments simulate a user's presence in the environment such that the user can interact with the virtual reality environment. For example, a hand movement such as a user gesture indicative of picking up an object can be reflected in the VR environment.

BRIEF DESCRIPTION OF THE DRAWINGS

FIG. 4 is a cross-sectional view of a finger section of one of the example haptic gloves of FIG. 1.

FIG. 5 is cross-sectional view of the finger section of FIG. 4 taken along line A-A in FIG. 4.

FIG. 6 is a block diagram of an example control unit having an example haptic controller that may be implemented for controlling at least one of the example haptic gloves of FIG. 1.

Figure 1:
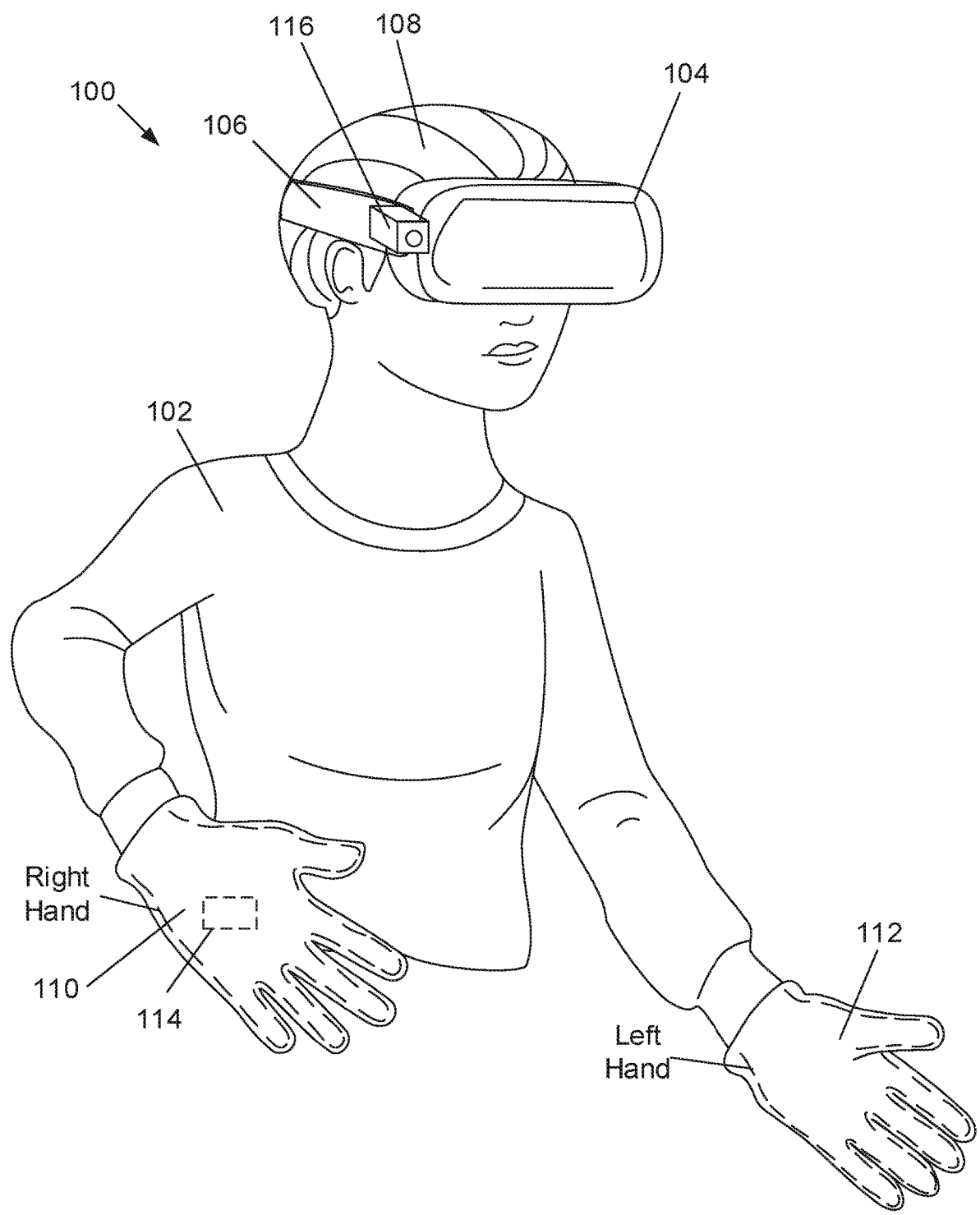
FIG. 1 illustrates an example virtual reality system utilizing example haptic gloves constructed in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

A virtual reality (VR) environment is a digital representation of an environment (e.g., a real or imaginary environment). VR systems simulate a VR environment using audio content and/or visual content. The VR environment can be displayed in any number of ways, for example, via a computer monitor, a virtual reality head-mounted device, speakers, etc. Some VR environments simulate a user's presence in the environment such that the user can interact with the virtual reality environment. Some known VR systems enable a user to interact with the VR environment using a controller, such as a joystick, or a handheld device. However, while known VR systems can provide excellent visual and audio simulation, these known VR systems have not yet provided the sensation of touch.

Disclosed herein are example methods, apparatus, systems, and articles of manufacture that provide the sense of touch to a user interacting with a VR environment. The example methods, apparatus, systems, and articles of manufacture may be used to provide touch sensation to a part of a user's body, such as the user's hand, for example, to simulate contact of the user's hand with an object in the VR environment. Disclosed herein are example haptic gloves that may be worn on the hands of a user. The example gloves may be worn while the user experiences the VR environment (e.g., via audio and/or visual content) and interacts with objects in the VR environment using the user's hands. The haptic gloves generate pressure on different sections of the user's hands to simulate the feeling of touching the objects in the VR environment. As such, the example gloves provide a realistic sense of touch.

An example haptic glove disclosed herein includes an ultrasonic array (referred to herein as an ultrasonic array device or an ultrasonic array chip) disposed on an inner surface of the glove. The ultrasonic array device includes a plurality of ultrasonic generators that are activated to produce ultrasonic waves at substantially the same frequency (e.g., within a tolerance level). The ultrasonic generators create sound waves in the ultrasound level, which is higher than the upper audible limit of human hearing (~20 kilohertz (kHz)). The ultrasonic waves interact (known as sound interference) to generate a focused pressure point at a particular distance from the ultrasonic array device. The ultrasonic array device is positioned on the inside of the glove and separated from the skin of the hand of the user such that when the ultrasonic array device is activated, the focused pressure point is generated at or near the skin on the hand. For example, the ultrasonic array device may be disposed on an inside of the glove near the tip of the index finger. When the ultrasonic array device is activated, a focused pressure point is created at or near the skin on the tip of the index finger. This focused pressure point replicates the counter-force that would be applied by an object on the tip of the finger, thereby simulating the feeling of touching the object with the tip of the finger. The frequency and/or intensity of the ultrasonic array device can be changed to produce different pressures that can simulate different forces and/or textures or materials. For example, a higher intensity can be used to create a higher pressure, which may simulate a harder, more rigid surface (e.g., metal). Whereas a lower intensity can be used to create a lower pressure, which may simulate a softer surface (e.g., rubber).

In some examples, the haptic glove includes a plurality of ultrasonic array devices disposed on the inner surface of the glove. The ultrasonic array devices are positioned at different locations around the inside of the glove and aimed at different sections of the hand. For example, a plurality of ultrasonic array devices may be disposed along the bottom side of the index finger section, along the sides of the index finger section, and/or along the top side of the index finger section. Likewise, ultrasonic array devices can be disposed along the other finger sections, along the palm side of the glove, the back of the hand side of the glove, etc. The ultrasonic array devices can be activated, independently or simultaneously, to simulate touch sensation on different parts of the hand, thus giving a 360° full range experience to the user's hand. The frequency and/or intensity of the different ultrasonic array devices can be changed to simulate different forces and/or textures.

In some examples, the haptic glove includes a control unit that activates or triggers the ultrasonic array device(s). The control unit may be implemented as, for example, an integrated circuit, sometimes referred to as a chip. The control unit may be coupled to (e.g., sewn or embedded in) the material of the glove. In some examples, the control unit includes a power source (e.g., a battery) to power the ultrasonic array device(s) and/or other components of the control unit. In some examples, the control unit includes a haptic controller that determines when to activate one or more of the ultrasonic array device(s) and at what frequency and/or intensity. For example, the haptic controller may determine when the distance between a section of a user's hand (e.g., a tip of the index finger) and an object in the VR environment is zero or substantially zero. Then, the haptic controller may activate the ultrasonic array device(s) (e.g., by sending an instruction to an ultrasonic array device actuator) corresponding to that section of the glove, thereby creating a focused pressure point on the user's hand that simulates contact of the user's hand with the object in the VR environment.

In some examples, a camera, such as a real-sense camera, is used to track the location of the user's hands. Image data collected by the camera can be processed by a processor (e.g., the haptic controller). Additionally or alternatively, one or more motion sensors may be used to detect the location of the user's hands. In some examples, the motion sensor(s) are wearable. For example, the sensor(s) may be mounted to, worn by, and/or carried on one or more body parts of the user. For instance, the haptic glove can include sensors such as flex sensor(s) to detect bending or flexing of the hand and/or fingers and/or an accelerometer to detect motion of the hand. Data collected by the sensors of the glove can be wirelessly transmitted to a processor for tracking hand motion.

The example haptic gloves disclosed herein have many benefits and can be used in numerous applications. For example, assume a user is interacting with a VR zoo of animals. The user may navigate around the zoo to see different animals (e.g., using a VR headset). Using the example gloves, the user can experience the feeling or sensation of touching the animals. In particular, the example gloves can simulate the feeling of touching the animals, which may enable the user to learn about and/or otherwise experience certain characteristics of the animals, such as the animal's size, weight, strength, hair texture, etc.

As another example, a user may be in a VR meeting with one or more other users. The users may view each other as avatars in the VR meeting. With the example gloves, the users can experience the feeling of shaking hands, hugging, and/or engaging in other contact with each other. This sort of haptic feedback builds a better relationship between the users (e.g., by experiencing a strong hand shake, a light hand shake, a high-five, etc.).

The example haptic gloves can similarly be used in other applications, such as online shopping, game playing, etc. Further, the haptic gloves may be used to create a feeling for something that does not exist. For example, the haptic gloves may create a touch feeling for each letter of the alphabet. A user can then read, communicate and/or otherwise experience these letters without actually seeing them. As another example, the example haptic gloves may be used to increase the effectiveness of gesture recognition processes, for example, by providing better feedback to the user when using hand gestures. Gesture recognition can also be used to determine when and what kinds of haptic feedback simulate with the gloves.

FIG. 1 illustrates an example virtual reality (VR) system 100 utilized by a user 102 to experience a VR environment. The example VR system 100 includes a visualization presenter 104 (e.g., a display screen) that displays a digital representation of the VR environment to the user 102. In the illustrated example, the visualization presenter 104 is part of a VR headset 106 to be worn on a head 108 of the user 102. The VR headset 106 may include a headband or other strap member to secure the visualization presenter 104 to the head 108 of the user. In other examples, the visualization presenter 104 may be implemented as another type screen, such as a television monitor, a computer monitor, a smartphone screen, etc. that is separated from the user 102. In some examples, the VR system 100 includes one or more speakers to provide audio from the VR environment to the user 102. From example, the VR headset 106 may include one or more speaker(s) to generate the audio content portion of the VR environment.

To provide the sense of touch to the user 102, the example VR system 100 includes a pair of haptic gloves constructed in accordance with the teachings of this disclosure. The pair of haptic gloves includes a first glove 110 to be worn on the user's right hand (shown in broken lines) and a second glove 112 to be worn on the user's left hand (shown in broken lines). In some examples, only one of the first glove 110 or the second glove 112 may be used. The first and second gloves 110, 112 provide touch feeling to the user's hands based on the location of the user's hands and the location(s) of one or more objects in the VR environment. For instance, if the user's right hand is in contact with an object in the VR environment, the first glove 110 generates a pressure on the skin of the hand of the user 102 that simulates the contact between the user's right hand and the object. The pressure mimics the feeling of touch and provides a realistic sensation of touching the object.

In the illustrated example, the first and second gloves 110, 112 are substantially the same. Thus, to avoid redundancy, and for the sake of clarity, many of the examples of this disclosure are described only in connection with the first glove 110. However, it is understood that these examples may be similarly implemented in connection with the second glove 112. Thus, any of the features disclosed in connection with the first glove 110 may also be applied to the second glove 112.

In the illustrated example, the first glove 110 includes a control unit 114 (which may be referred to as a control unit chip or a management chip). The control unit 114 receives information from one or more components of the VR system 100 (e.g., the visualization presenter 104, the camera 116, etc.) and determines when and/or where to apply pressure on the user's right hand. The control unit 114 may include a power source (e.g., a battery) and a transceiver. The control unit 114 may be implemented as, for example, an integrated circuit (sometimes referred to as a chip). An example of the control unit 114 is disclosed in further detail in conjunction with FIG. 6. In the illustrated example of FIG. 1, the control unit 114 is coupled to the first glove 110 on the back side of the hand section. For example, the control unit may be disposed within (e.g., sewn into or otherwise embedded in) the material of the first glove 110. In some examples, the second glove 112 includes a similar control unit to control the second glove 112. In some examples, the control unit 114 of the first glove 110 may process information for both the first glove 110 and the second glove 112 and communicate with the second glove 112. In some examples, the control unit 114 on the first glove 110 includes a processor (e.g., the haptic controller 606 of FIG. 6) that determines, based on information about the VR environment, when to where to apply pressure on the user's right hand. In other examples, the processor may be remote to the first glove 110, and the control unit 114 may receive commands or instructions from the processor (disclosed in further detail herein).

In some examples, to determine the location of the first glove 110 (and, thus, the user's right hand) in the VR environment, the example VR system 100 includes a camera 116. The camera 116 may be, for example, a real-sense camera to sense or detect a position of the user's hands. In the illustrated example, the camera 116 is carried by the VR headset 106. The camera 116 obtains image or video data that can be processed to determine the location of the user's right. In some examples, an image of the user's right hand is displayed in the VR environment. For example, if the user 102 moves his/her right hand in front of the user's face, a digital hand may be displayed to the user 102 on the visualization presenter 104. In some examples, the camera 116 may not be attached to the user 102. Instead, the camera 116 may be disposed in another location near the user 102 (e.g., in a corner of a room and pointing toward the user 102). In some examples, more than one camera is utilized. In some such examples, the camera(s) may generate a collective or aggregate field of view for capturing one or more images (e.g., video) of the hands (and/or other body parts) of the user 102. In some examples, in addition to or as an alternative to the camera 116, the example VR system 100 may include one or more position-detecting device(s) to obtain data indicative of position and/or movement of one or more body parts of the user 102, such as the user's hands. The position-detecting device(s) may include sensors, such as wearable sensors. The wearable sensor(s) may include, for example, a bend sensor(s), an accelerometer(s), a vibration sensor(s), a gravitational sensor(s), a force sensor(s), etc. and may be positioned to develop signals representative of movement(s) and/or position(s) of a body part on which the sensor is mounted. In some examples, one or more of the sensors are incorporated into the first glove 110. In some examples, the first glove 110 includes an adjustment member (e.g., a Velcro strap, an elastic strap, etc.) to tighten the wrist portion of the first glove 110 onto the wrist of the user 102. In other examples, no adjustment member may be utilized.

Figure 2:
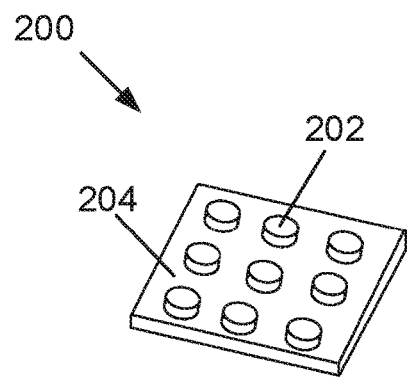
FIG. 2 illustrates an example ultrasonic array device that may be implemented in the example haptic gloves of FIG. 1.

FIG. 2 illustrates an example ultrasonic array 200, referred to herein as the ultrasonic array device 200, that may be utilized in the first glove 110 (FIG. 1) to generate haptic feedback on the right hand of the user 102 (FIG. 1) (e.g., via a pressure point on or near the skin on the right hand). The example ultrasonic array device 200 includes a set of ultrasonic generators 202 (one of which is referenced in FIG. 2) disposed on a substrate 204. The substrate 204 may be, for example, a circuit board or chip with electrical components (e.g., wires, electrical connections, resistors, etc.) to operate the ultrasonic generators 202. In the illustrated example, the ultrasonic array device 200 includes nine ultrasonic generators 202. However, in other examples, the ultrasonic array device 200 may include more or fewer ultrasonic generators 202. In some examples, the ultrasonic generators 202 are arranged in a pattern, such as a pattern of rows and columns (e.g., a grid or matrix). For example, in the illustrated example of FIG. 2, the ultrasonic generators 202 are arranged in a 3×3 grid, spaced equidistant from each other. However, in other examples, the ultrasonic generators may be arranged in other patterns (e.g., 4×4, 5×5, etc.) and may be spaced further from or closer to each other. Further, while in the illustrated example of FIG. 2 the substrate 204 is substantially flat or planar, in other examples, the substrate 204 may be curved. For example, the substrate 204 may be curved to match the curvature of a section of the hand (e.g., a finger).

Figure 3:
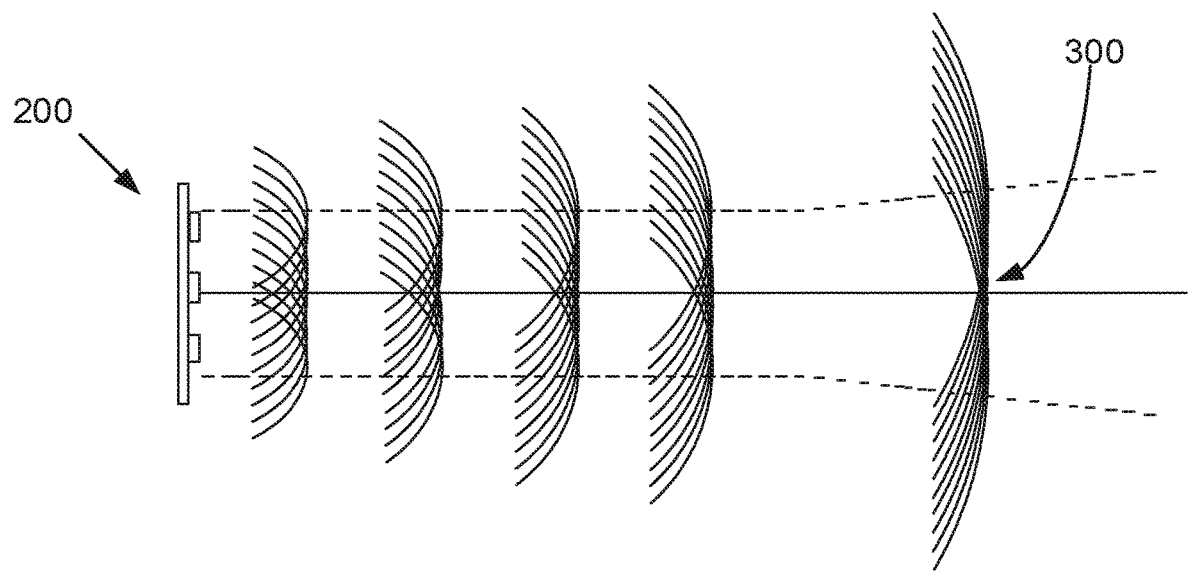
FIG. 3 shows an example focused pressure point created by the example ultrasonic array device of FIG. 2.

Each of the ultrasonic generators 202 may be activated (e.g., triggered or excited) to generate an ultrasonic wave. When the ultrasonic generators 202 are activated, the waves generated by the ultrasonic generators 202 interact with each other (sometimes referred to as sound interference). In general, sound waves include a repeating pattern of high-pressure regions (compressions) and low-pressure regions (rarefactions) moving through a medium (e.g., air). When the compressions or rarefactions of two or more waves line up, the waves are strengthened to a higher intensity (known as constructive interference). On the other hand, when the compressions or rarefactions are out of phase, their interaction creates a wave with a dampened or lower intensity (known as destructive interference). At certain distances from the ultrasonic array device 200, the compressions (e.g., crests or peaks) of the waves align, thereby creating a combined or constructed high-pressure point. FIG. 3 shows an example of the ultrasonic waves generated by the ultrasonic array device 200. Each of the ultrasonic generators 202 of the ultrasonic array device 200 are activated at the same frequency. At certain distances from the ultrasonic array device 200, the compressions of certain ones of the waves align. At a particular distance from the ultrasonic array device 200, the compression of all of the waves generated by each ultrasonic generators 202 are incident on a same point and the compressions combine to create a focused pressure point 300. At the focused pressure point 300, a resultant amplitude is formed that is equal to the vector sum of the amplitudes of the individual waves. By operating the ultrasonic generators 202 at the same frequency, the location of the construct interference remains the same. As will be disclosed in further detail herein, the ultrasonic array device 200 may be positioned to generate the focused pressure point 300 at or near the skin of the user 102 (FIG. 1) to simulate or mimic the feeling of touch.

The location of the focused pressure point 300 is dependent on the frequency of the ultrasonic generators 202 (as well as the spatial arrangement of the ultrasonic generators 202). Thus, the frequency of the ultrasonic generators 202 may be changed to move the focused pressure point 300 closer to or further from the ultrasonic array device 200. In general, the focused pressure point 300 is at least one wavelength away from the ultrasonic array device 200. For example, at 20 kHz, the focused pressure point 300 may be about 17 millimeters (mm) from the ultrasonic array device 200. This distance may be determined using the following equation: $\lambda = c/f$, where $\lambda$ is wavelength, c is wave speed, and f is frequency. With a frequency f of 20 kHz and a wave speed c of 300 meters/s (m/s), the wave length $\lambda$, is about 17 mm. At 200 kHz, for example, the focused pressure point may be about 1.7 mm from the ultrasonic array device 200. Therefore, if the ultrasonic generators 202 are operable between 20 kHz and 200 kHz, for example, then the ultrasonic array device 200 should be spaced apart from the skin of the hand by at least about 1.7 mm. In some examples, the frequency may be higher and, thus, the needed spacing may be even lower than 1.7 mm. Thus, the focused pressured point 300 can be changed by changing the frequency of the ultrasonic waves. The ultrasonic generators 202 may be activated at different frequencies (of about 20 kHz and above) depending on the desired distance to create the focused pressure point 300.

In some examples, the standard operating frequency is about 40 kHz, which has a wavelength of about 8.5 mm from the ultrasonic array device 200. The focal distance and diameter ratio of the ultrasonic array device 200 may be about 0.65-0.85, which corresponds to a diameter of about 6.5-17 mm. If the frequency is at 40 kHz and the focal distance is 10 mm (larger than 8.5 mm), for example, then the diameter is 10/(0.65-0.85)=about 12-15 mm.

Further, the intensity (amplitude) of the ultrasonic waves can be increased or decreased (e.g., by increasing or decreasing the electrical signal to the ultrasonic generators 202) to increase or decrease the pressure at the focused pressure point 300. In some examples, even a pressure of 0.1 Pascal (Pa) (0.00102 grams per square centimeter ($g/cm^2$)) can be felt on the skin of a human and, thus, is sufficient to obtain haptic feeling. In other examples, the pressure generated at the focused pressure point 300 may be higher or lower. In some examples, the ultrasonic array device 200 generates a pressure of about 1.8 $g/cm^2$ to about 10 $g/cm^2$.

FIG. 4 is a cross-sectional view of a finger section 400 of the first glove 110. In the illustrated example, the first glove 110 includes a first layer 402 (e.g., an outer layer) and a plurality of the ultrasonic array devices 200a-200n coupled to an inner surface 404 of the first layer 402. The first layer 402 may be constructed of, for example, cloth (e.g., cotton), knitted or felted wool, leather, rubber, latex, neoprene, chain-mesh, and/or any other material capable of being worn as a glove and supporting one or more ultrasonic array devices. In some examples, the first layer 402 may be relatively rigid to maintain a substantially cylindrical shape. In other examples, the first layer 402 may be relatively flexible to may bend or curve more with movement of the finger.

In the illustrated example, the ultrasonic array devices 200a-200n are disposed along the inner surface 404 of the first layer 402 and pointed inwardly, toward the skin of the user's finger. The ultrasonic array devices 200a-200n may be substantially the same as the ultrasonic array device 200 depicted in FIGS. 2 and 3. Each of the ultrasonic array devices 200a-200n may have the same or a different number of ultrasonic generators, which may be arranged in various patterns. In the illustrated example of FIG. 4, twelve (12) ultrasonic array devices 200a-200l are depicted as being disposed along a top and a bottom side of the finger section 400. In other examples, the finger section 400 may include more or fewer ultrasonic array devices and/or the ultrasonic array devices may be disposed in other locations and/or spaced differently. The ultrasonic array devices 200a-200n may also be disposed around the sides of the finger. For example, FIG. 5 illustrates a cross-sectional view of the finger section 400 taken along line A-A in FIG. 4. As shown in FIG. 5, six (6) ultrasonic array devices 200e, 200h, 200m, 200n, 200o, 200p are disposed around the circumference of the finger section 400 at the cross-section. In other examples, more or fewer ones of the ultrasonic array devices 200a-200n may be disposed around the circumference of the finger section 400 and/or spaced differently. Likewise, a plurality of the ultrasonic array devices 200a-200n may be distributed around the circumference of the finger section 400 at other cross-sections of the finger section 400. In the illustrated example, the ultrasonic array devices 200a-200n are curved to match the curvature of the user's finger. However, in other examples, the ultrasonic array devices 200a-200n may be substantially flat or planar (e.g., similar to the ultrasonic array device 200 depicted in FIG. 2).

Depending on where the touch sensation is to be applied, one or more of the ultrasonic array devices 200a-200n may be activated to generate haptic feedback on different section of the user's hand (e.g., by producing pressure at or near the skin of the user's hand). For example, if the bottom side of the user's finger is in virtual contact with an object in the VR environment, the ultrasonic array devices 200a-200f, which are along the bottom side of the user's finger, can be activated to create focused pressure points along the bottom side of the user's finger, thereby simulating contact with the object in the VR environment. Each of the ultrasonic array devices 200a-200n corresponds to a particular section of the first glove 110 and, thus, the associated section of the user's hand. In some examples, only one of the ultrasonic array devices 200a-200n is activated. In other examples, multiple ones of the ultrasonic array devices 200a-200n are activated.

As described above in connection with FIGS. 2 and 3, each of the ultrasonic array devices 200a-200n produces a focused pressure point at a certain distance from the respective ultrasonic array device 200a-200n. Therefore, the ultrasonic array devices 200a-200n are to be spaced apart from the skin of the user's hand. In some examples, the ultrasonic array devices 200a-200n are to be separated from the skin at least about 1.7 mm (e.g., for operating at 200 kHz). In other examples, the ultrasonic array devices 200a-200n may be spaced closer to or further from the skin based on the intended frequency to be applied.

To separate the ultrasonic array devices 200a-200n from the user's hand, the example first glove 110 may include one or more spacers (e.g., a rib, a web, etc.). For instance, in the illustrated example of FIG. 4, the finger section 400 includes a first spacer 406 and a second spacer 408. The first and second spacers 406, 408 are coupled to the inner surface 404 of the first layer 402 and extend inwardly toward the finger. As the finger bends and/or moves, the spacers 406, 408 are moved in the same direction to maintain the first layer 402 (and, thus, the ultrasonic array devices 200a-200n) separated from the skin of the finger. Thus, a substantially constant gap or space is maintained between the ultrasonic array devices 200a-200n and the skin of the finger. In some examples, the first and second spacers 406, 408 are rings that extend around the user's finger. In other examples, the first and second spacers 406, 408 may be formed of one or more individual members that extend inward from the first layer 402 (e.g., similar to spokes on a wheel). In the illustrated example of FIG. 4, the first spacer 406 is positioned near one knuckle (e.g., a joint) of the finger and the second spacer 408 is positioned near the other knuckle of the finger. In other examples, the first spacer 406 and/or the second spacer 408 may be disposed in other locations. Also, while in the illustrated example two example spacers 406, 408 are implemented, in other examples, the finger section 400 may include more (e.g., three, four, etc.) or fewer (e.g., one) spacers in the finger section 400.

In some examples, the first glove 110 includes a second layer 410 (e.g., an inner layer) that is disposed within and separated from the first layer 402. The second layer 410 may be relatively tight and sticks to the hand of the user 102. For example, the second layer 410 may be constructed of a latex material that substantially conforms to the shape of the hand. In other examples, the second layer 410 may be constructed of other types of materials. The first and second spacers 406, 408 may be coupled between the first layer 402 and the second layer 410. As such, when the user moves his/her hand, the first layer 402 (and, thus, the ultrasonic array devices 200a-200n) remain separated (distanced) from the second layer 410 and, thus, the skin of the user. The ultrasonic array devices 200a-200n may be spaced apart from the second layer 410 and/or operated at a particular frequency that produces a focused pressure point at or near the second layer 410, which can be felt against the skin of the hand that is in contact with the second layer 410.

In some examples, one or more wires and/or other electrical connectors are coupled to (e.g., embedded in) the first layer 402. The wires and/or other electrical connectors electrically couple the ultrasonic array devices 200a-200n to the control unit 114 (FIG. 1), which may be coupled to the first glove 110 near a back side of the hand. The control unit 114 may activate one or more of the ultrasonic array devices 200a-200n by providing an electrical signal (e.g., an alternating signal at an ultrasonic frequency) to the ultrasonic array device(s) 200a-200n. The control unit 114 may control the frequency and/or intensity of the ultrasonic wave(s) produced by the ultrasonic array device(s) 200a-200n. In particular, the control unit 114 may activate the ultrasonic array devices 200-200n at particular frequencies and/or intensities to generate the desired focused pressure point on the skin of the user. In some examples, each of the ultrasonic array devices 200a-200n is spaced the same distance from the skin of the user. In other examples, the ultrasonic array devices 200a-200n may be spaced differently. In some examples, two or more ultrasonic array devices may be combined into a group and separated from the skin of the user by different distances. For example, three ultrasonic array devices may be stacked on top of each other. The ultrasonic array devices may be slightly offset or include openings to allow the waves of the lower ultrasonic array devices (the ultrasonic array devices further from the hand) to pass through. The ultrasonic array devices of the group can be activated simultaneously or independently to simulate different feelings on the particular section of the skin of the user.

While only one finger section of the first glove 110 is illustrated in FIG. 4, one or more other sections of the first glove 110 may include a similar arrangement of the ultrasonic array devices 200a-200n. In particular, one or more of the ultrasonic array devices 200a-200n may be similarly disposed along the inner surface 404 of the first glove 110 and used to create pressure on different sections of the user's hand. For example, each finger section of the first glove 110 may be similar to the finger section 400. The finger sections may include the same or different numbers of ultrasonic array devices, and the ultrasonic array devices may be disposed in various locations around the respective fingers. Additionally or alternatively, ultrasonic array devices may be similarly disposed along the inner surface 404 of the first glove 110 along the back of the hand section and/or the palm section. Thus, ultrasonic array devices can be disposed all around the skin of the hand to provide a 360° touch experience.

While in the illustrated example of FIG. 4 a plurality of ultrasonic array devices are implemented in the finger section 400 of the first glove 110, in other examples, the finger section 400 may include only one ultrasonic array device. For example, one ultrasonic array device may be positioned near the bottom side of the finger. In some examples each finger section of the first glove 110 includes one ultrasonic array device, which may provide touch sensation to just the tips of the fingers, for example. In other examples, any of the finger sections, the back section, and/or the palm section of the first glove 110 may include any number of ultrasonic array devices.

Also, while in the illustrated example of FIG. 1 the first glove 110 covers the entire right hand, in other examples, the example first glove 110 may be implemented as covering to be worn around just a portion of a hand of a user. For example, an individual finger sleeve, similar to the finger section 400 of FIG. 4, may be worn on one finger of the user 102. In some examples, individual finger sleeves may be disposed on each of the fingers. In such an example, no ultrasonic array devices are used on the back and palm sections of the hand.

Further, while the example first glove 110 is described as being disposed on a hand of a user, the example structures disclosed in connection with the first glove 110 may be similarly implemented in other types of garments, such as a shirt, a pair of pants, a hat, etc. For example, a shirt may include a plurality of ultrasonic array devices coupled to an inner surface of the shirt and aimed toward different sections of the user's body. Similar to the example first glove 110, the ultrasonic array device(s) on the shirt can be activated to create pressure at or near the skin of the user to simulate touch between the user's body and one or more object(s) in the VR environment.

FIG. 6 is a block representation of the example control unit 114 that may be used for controlling the first glove 110. In the illustrated example, the control unit 114 includes an ultrasonic array actuator 600 (e.g., a controller), referred to herein as the ultrasonic device actuator 600, which controls the activation of the ultrasonic array device(s) 200a-200n (e.g., via one or more control signals). The example control unit 114 also includes a battery 602. The battery 602 supplies power to the component(s) of the control unit 114 and to the ultrasonic array device(s) 200a-200n. In some examples, the battery 602 may be recharged by connecting a cord or wire to the battery 602. In other examples, the battery 602 may be removed from the first glove 110 and recharged separately, away from the first glove 110. The ultrasonic device actuator 600 may selectively supply power (at a particular intensity and/or frequency) to the ultrasonic array device(s) 200a-200n to generate the desired ultrasonic waves.

To communicate with the visualization presenter 104, the camera 116, and/or other component(s) of the VR system 100 (FIG. 1), the example control unit 114 includes a wireless transceiver 604, which operates as a receiver and a transmitter. The transceiver 604 may be, for example, a Bluetooth® transceiver. In other examples, other types of wireless transceivers may be implemented. Additionally or alternatively, a communication line (e.g., a wire, a cord, etc.) may be physically coupled between the control unit 114, the visualization presenter 104, the camera 116 and/or any other component of the VR system 100.

In the illustrated example, the control unit 114 includes an example haptic controller 606 that determines when and/or which one(s) of the ultrasonic array devices 200a-200n to activate. In the illustrated example, the haptic controller 606 includes an object location determiner 608, a hand location determiner 610, a distance calculator 612, an ultrasonic array device (UAD) selector 614, a frequency/intensity determiner 616 and a memory 618. In the illustrated example, the object location determiner 608 of the example haptic controller 606 determines the location(s) of one or more objects in the VR environment. The location(s) may include the coordinates or boundaries of the surface(s), edge(s), etc. of the respective object(s). In some examples, the object location determiner 608 determines the location of the one more objects based on VR environment data received via the transceiver 604. The VR environment data may include information relating to the layout of the VR environment, the user's current position in the VR environment, the type of object(s) in the VR environment, the location(s) of the object(s) in the VR environment, what VR scene is being displayed to the user 102, etc. In some examples, the VR environment data is transmitted from the visualization presenter 104 or the VR headset 106 to the control unit 114. In other examples, a separate processor or module may transmit the VR environment data to the control unit 114 and/or other components of the VR system 100.

The hand location determiner 610 of the example haptic controller 606 determines the location one or both of the user's hands in the VR environment. To avoid redundancy, only the right hand is described below. In some examples, the hand location determiner 610 determines the location of the right hand by determining a location of the first glove 110. In some examples, the hand location determiner 610 receives image or video information from the camera 116 and determines the location, orientation, etc. of the first glove 110 (and/or the user's hand) in the VR environment based on the information from the camera 116. Additionally or alternatively, one or more motion sensors may be coupled to the first glove 110 to detect movements and/or other information about the location of the first glove 110. The information may be transmitted to the control unit 114 (and received via the transceiver 604), and the hand location determiner 610 may determine the location of the first glove 110 based on the information. In some examples, the first glove 110 (FIG. 1) is divided into a plurality of discrete sections, such as a bottom tip of each finger, a bottom middle section of each finger, a top tip of each finger, etc., and one or more of the ultrasonic array devices 200a-200n may associated with each of the sections. The location of each of the sections and the corresponding ultrasonic array devices 200a-200n may be stored in the memory 618 (e.g., a first ultrasonic array device is associated with the bottom tip of the index finger, a second ultrasonic array device is associated with the bottom tip of the middle finger, etc.). In some examples, the hand location determiner 610 determines the location of the different sections of the first glove 110 in the VR environment, which may be used to determine which of the ultrasonic array devices 200a-200n to activate (as discussed in further detail herein).

In the illustrated example, the distance calculator 612 calculates distances between the locations of the different sections of the first glove 110 (and/or the right hand), as determined by the hand location determiner 610, and the locations (e.g., boundaries) of the one or more objects in the VR environment, as determined by the object location determiner 608. If a distance is zero or substantially zero (e.g., within a tolerance of zero) between a section of the first glove 110 and the location of an object in the VR environment, the user's hand or a section/part of the user's hand is in virtual contact with the object in the VR environment. In such an instance, the UAD selector 614 determines which one(s) of the ultrasonic array device(s) 200a-200n that correspond to the section of the first glove 110 or the hand that is in virtual contact with the object and sends an instruction to the ultrasonic device actuator 600 to activate the associated one(s) of the ultrasonic array device(s) 200a-200n. In some examples, the distance calculator 612 continues calculating and recalculating the distances between the different sections of the first glove 110 and the objects in the VR environment based on updated location information about the right hand. If the distance(s) is no longer zero or substantially zero (e.g., because the user 102 move the right hand away from the object), the UAD selector 614 sends an instruction to the ultrasonic device actuator 600 to cease activation of the associated ultrasonic array devices 200a-200n. This process may be repeated constantly during the VR session.

In some examples, the frequency and/or intensity of the ultrasonic waves may be varied to create different haptic effects. In the illustrated example, the frequency/intensity determiner 616 of the example haptic controller 606 may determine the frequency and/or intensity at which to activate the ultrasonic array device(s) 200a-200n based on the desired pressure and/or texture to be applied. For example, by activating the ultrasonic array device(s) 200a-200n at a higher intensity (amplitude) (e.g., with a stronger electrical signal), the focused pressure point has a higher pressure, which simulates a greater force on the skin of the user's hand. Also, the frequency can be changed to move the location of the focused pressure point. Moving the focused pressure point closer to or further from the skin of the user may also create different feelings on the skin of the user 102, which may be used to mimic different textures (e.g., wood, water, glass, sand, hair, etc.). In some examples, a table of textures and the corresponding frequencies/intensities is stored in the memory 618. The frequency/intensity determiner 616 may select a certain frequency and/or intensity based on the desired pressure or texture to be replicated.

While in the illustrated example of FIG. 6 the haptic controller 606 is depicted as part of the control unit 114 (e.g., integrated into the first glove 110), in other examples, the haptic controller 606 may be integrated in other components of the VR system 100. For example, the haptic controller 606 may be incorporated into the VR headset 106. In such an example, the haptic controller 606 may transmit one or more signals to the control unit 114 indicating which ones of the ultrasonic array device(s) 200a-200n to activate, when to activate the corresponding ultrasonic array device(s) 200a-200n, the frequency and/or intensity to activate the corresponding ultrasonic array device(s) 200a-200n, etc.

While an example manner of implementing the haptic controller 606 is illustrated in FIG. 6, one or more of the elements, processes and/or devices illustrated in FIG. 6 may be combined, divided, re-arranged, omitted, eliminated and/or implemented in any other way. Further, the example object location determiner 608, the example hand location determiner 610, the example distance calculator 612, the example UAD selector 614, the example frequency/intensity determiner 616, the example memory 618 and/or, more generally, the example haptic controller 606 of FIG. 6 may be implemented by hardware, software, firmware and/or any combination of hardware, software and/or firmware. Thus, for example, any of the example object location determiner 608, the example hand location determiner 610, the example distance calculator 612, the example UAD selector 614, the example frequency/intensity determiner 616, the example memory 618 and/or, more generally, the example haptic controller 606 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example object location determiner 608, the example hand location determiner 610, the example distance calculator 612, the example UAD selector 614, the example frequency/intensity determiner 616, and/or the example memory 618 is/are hereby expressly defined to include a tangible computer readable storage device or storage disk such as a memory, a digital versatile disk (DVD), a compact disk (CD), a Blu-ray disk, etc. storing the software and/or firmware. Further still, the example haptic controller 606 of FIG. 6 may include one or more elements, processes and/or devices in addition to, or instead of, those illustrated in FIG. 6, and/or may include more than one of any or all of the illustrated elements, processes and devices.

Figure 7:
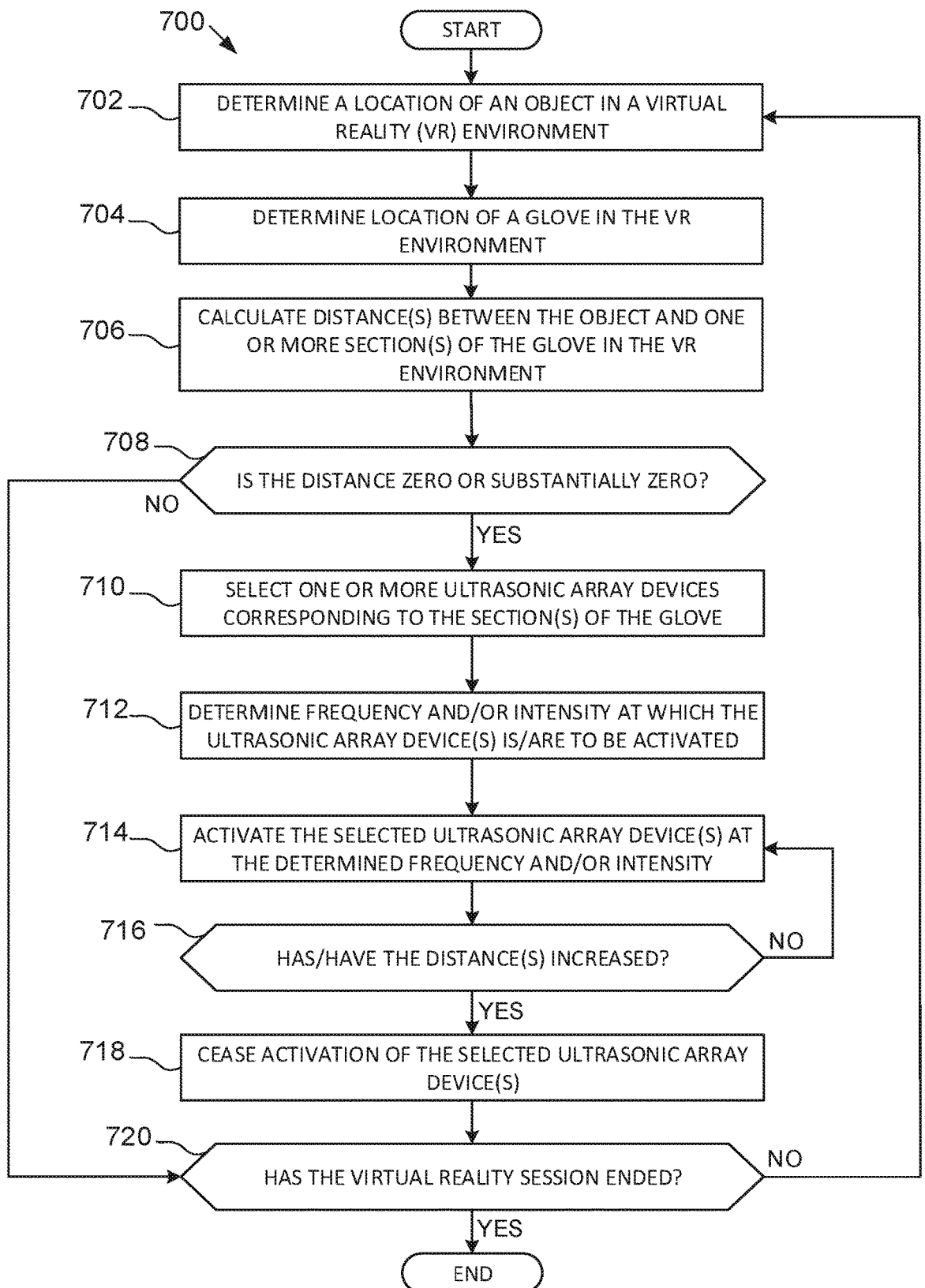
FIG. 7 is a flowchart representative of example machine readable instructions that may be executed to implement the example haptic controller of FIG. 6.

A flowchart representative of example machine readable instructions for implementing the example haptic controller 606 of FIG. 6 is shown in FIG. 7. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 8, many other methods of implementing the example haptic controller 606 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example process of FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 7 is a flowchart 700 representative of example machine readable instructions that may be executed by the example haptic controller 606 of FIG. 6. At block 702, the example object location determiner 608 determines a location of an object in the VR environment. Therefore, the object location determiner 608 provides means for determining a location of an object in a virtual reality environment. In some examples, the location may be defined by the coordinates of the surface(s), edge(s), etc. that define the object in the 3D space of the VR environment. In some examples, the object location determiner 608 determiners the location of the object based on VR environment data transmitted by the visualization presenter 104 and/or another component of the VR system 100.

At block 704, the example hand location determiner 610 determines the location of the first glove 110 (which substantially corresponds to the location of the right hand) in the VR environment. In some examples, the hand location determiner 610 determines the location of the first glove 110 based on image or video data from the camera 116. Additionally or alternatively, one or more motion sensors (e.g., a wearable sensor mounted to the first glove 110) may be used to detect the location of the first glove 110. In some examples, the hand location determiner 610 determines the location of the different sections or parts of the first glove 110 (e.g., the palm section, the back of the hand section, top and/or bottom sides of the thumb section, the index finger section, the middle finger section, the ring finger section, and/or the pinky finger section, etc.). Therefore, the hand location determiner 610 provides means for determining a location of a section of the first glove 110 in the virtual reality environment.

At block 706, the example distance calculator 612 calculates the distance(s) between the location of the object (e.g., coordinates of the surfaces or boundaries that define the object) and the location(s) of one or more section(s) of the first glove 110 in the VR environment. Therefore, the example distance calculator 612 provides means for calculating a distance between a location of a section of a glove and a location of an object in the virtual reality environment. At block 708, the example distance calculator 612 determines if any of the distances are zero or substantially zero (e.g., within a threshold, such as 2 mm).

If the distance between one or more of the sections of the first glove 110 and the object is zero or substantially zero, the example UAD selector 614, at block 710, selects or identifies the one or more of the ultrasonic array devices 200a-200n that correspond to the associated section(s) of the first glove 110. Therefore, the UAD selector 614 provides means for selecting one or more of the ultrasonic array devices 200a-200n to activate. At block 712, the frequency/intensity determiner 616 determines a frequency and/or an intensity at which to activate each of the selected ultrasonic array device(s) 200a-200n. Therefore, the frequency/intensity determiner 616 provides means for determining at least one of a frequency or an intensity at which to activate an ultrasonic array device. In some examples, each of the selected ultrasonic array device(s) 200a-200n is to be activated at the same frequency and intensity. In other examples, the selected ultrasonic array device(s) 200a-200n are to be activated a different frequencies and/or intensities than each other. At block 714, the UAD selector 614 instructs the ultrasonic device actuator 600 to activate the selected ultrasonic array device(s) 200a-200n at the determined frequencies and/or intensities. The activated ultrasonic array device(s) 200a-200n generate focused pressure points at or near the skin on the hand of the user that simulates contact with the object in the VR environment. Therefore, the UAD selector 614 and/or the ultrasonic device actuator 600 provide means for activating an ultrasonic array device when the calculated distance is zero or substantially zero (e.g., within a threshold).

At block 716, the distance calculator 612 recalculates the distances between the section(s) of the first glove 110 and the location of the object (e.g., based on updated location data of the first glove 110) to determine if the distances between the section(s) of the first glove 110 and the object has/have increased (or is/are no longer zero or substantially zero). An increased distance indicates the corresponding section of the first glove 110 (and, thus, the user's right hand) is no longer in virtual contact with the object in the VR environment. If the distance has not changed (i.e., is still zero or substantially zero), the ultrasonic device actuator 600 continues to activate the selected ultrasonic array device(s) 200*a*-200*n*. Otherwise, if the distance has increased (and is no longer zero or substantially zero), at block 718, the UAD selector 614 instructs the ultrasonic device actuator 600 to cease activation of the selected ultrasonic array device(s) 200*a*-200*n*.

At block 720, the haptic controller 606 determines whether the VR session has ended (e.g., by user interaction with an on/off switch). If the VR session has not ended, control returns to block 702 and the example process of FIG. 7 repeats again. The example process of FIG. 7 may be performed for the same object and/or a different object in the VR environment. In some examples, the process of FIG. 7 is performed simultaneously for multiple objects in the VR environment. For example, the haptic controller 606 may continuously check the distances between the different sections of the user's hands and the location of the different objects in the VR environment. Otherwise, if the VR session has ended, the example process of FIG. 7 ends.

Figure 8:
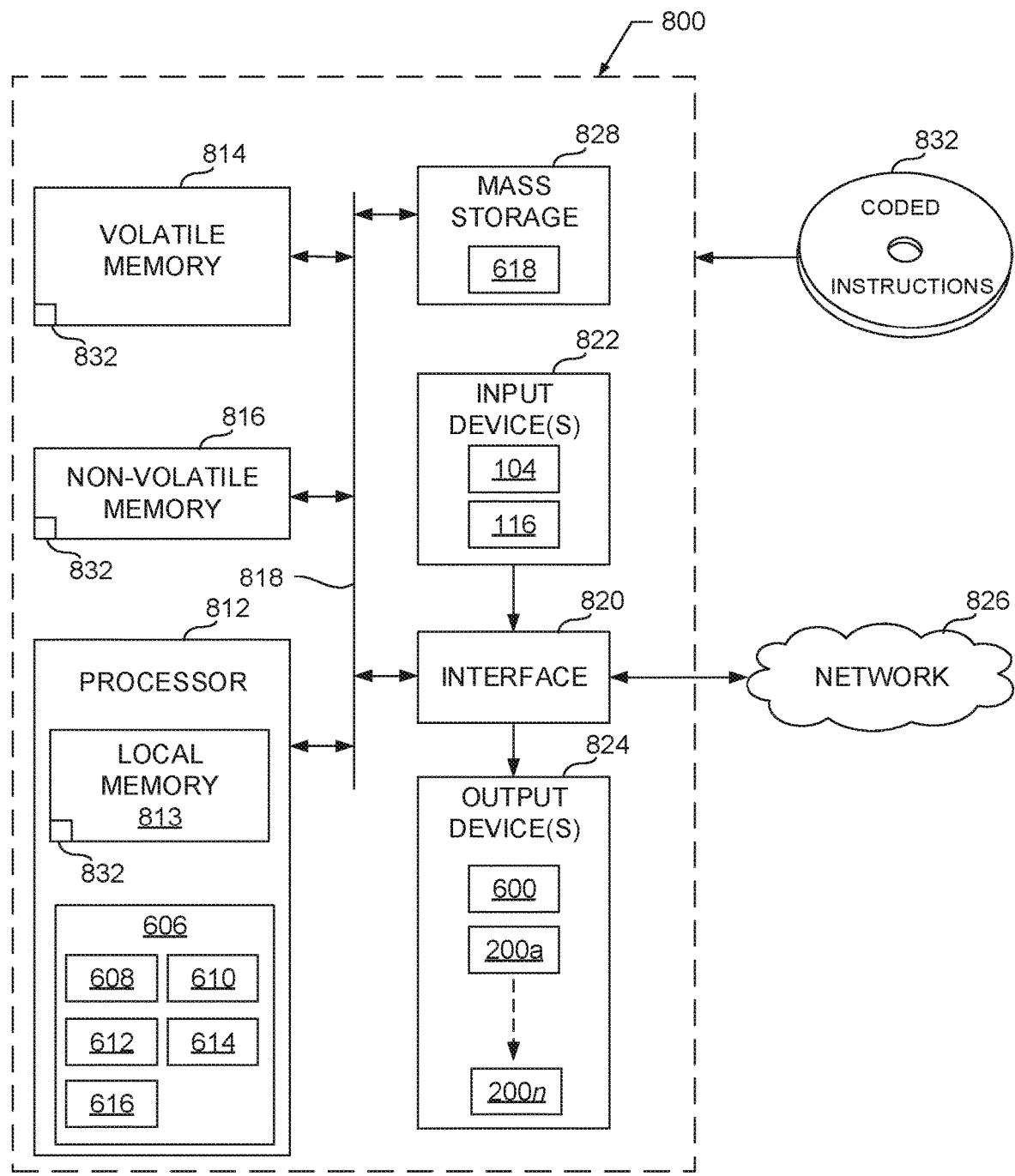
FIG. 8 illustrates an example processor platform that may execute the example instructions of FIG. 7 to implement the example haptic controller of FIG. 6.

FIG. 8 is a block diagram of an example processor platform 800 capable of executing the instructions of FIG. 7 to implement the haptic controller 606 of FIG. 6. The processor platform 800 can be, for example, an embedded processing device, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device. In this example, the processor 812 may implement the example object location determiner 608, the example hand location determiner 610, the example distance calculator 612, the example UAD selector 614, the example frequency/intensity determiner 616, and/or, more generally, the example haptic controller 606.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system. In this example, the input device(s) may include the visualization presenter 104, the camera 116, and/or other components of the VR system 100.

One or more output devices 824 are also connected to the interface circuit 820 of the illustrated example. The output device(s) 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor. In this example, the output device(s) 824 may include the ultrasonic device actuator 600 and/or the ultrasonic array devices 200*a*-200*n*.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives. The mass storage device(s) 828 may implement the memory 618.

Coded instructions 832 of FIG. 7 may be stored in the mass storage device 828, in the volatile memory 814, in the non-volatile memory 816, and/or on a removable tangible computer readable storage medium such as a CD or DVD.

From the foregoing, it will be appreciated that methods, apparatus, systems, and articles of manufacture have been disclosed herein to provide touch sensation to a user interacting with a VR environment. Disclosed examples utilize one or more ultrasonic array devices disposed in a glove or other covering (e.g., a garment) to create focused pressure points on the skin of the user that mimic or simulate the feeling of touching an object in a VR environment. Thus, disclosed examples provide more realistic interaction with objects in a VR environment than known VR systems. Further, the example gloves disclosed herein are portable and can be easily transported and used at any time or place.

Example methods, apparatus, systems, and articles of manufacture to provide haptic feedback to a user are disclosed herein. Further examples and combinations thereof include the following:

Example 1 includes an apparatus including a glove to be worn on a hand of a user, an ultrasonic array disposed on an inner surface of the glove, and a control unit to activate the ultrasonic array to generate haptic feedback on the hand of the user.

Example 2 includes the apparatus of Example 1, wherein the ultrasonic array includes a substrate and a plurality of ultrasonic generators disposed on the substrate.

Example 3 includes the apparatus of Example 2, wherein the plurality of ultrasonic generators are arranged in a pattern of rows and columns on the substrate.

Example 4 includes the apparatus of Example 2, wherein the control unit is to activate the plurality of ultrasonic generators at substantially a same frequency.

Example 5 includes the apparatus of Example 1, wherein the glove includes an outer layer and an inner layer, the inner layer to be in contact with the hand, the outer layer to be spaced apart from and surrounding the inner layer, the inner surface of the glove corresponding to an inner surface of the outer layer, and the ultrasonic array coupled to the inner surface of the outer layer and facing the inner layer.

Example 6 includes the apparatus of Example 5, wherein the glove includes a spacer between the inner layer and the outer layer to separate the outer layer from the inner layer.

Example 7 includes the apparatus of Example 1, wherein the ultrasonic array is disposed in a finger section of the glove.

Example 8 includes the apparatus of Example 1, wherein the control unit is coupled to the glove near a back side of the hand.

Example 9 includes the apparatus of Example 1, wherein the control unit includes a power source to power the ultrasonic array.

Example 10 includes the apparatus of Example 1, wherein the control unit includes a transceiver to receive information about a virtual reality environment experienced by the user.

Example 11 includes the apparatus of Example 1, further including a plurality of ultrasonic arrays disposed on the inner surface of the glove, the plurality of ultrasonic arrays to generate haptic feedback on different sections of the hand.

Example 12 includes the apparatus of any of Examples 1-11, wherein the ultrasonic array is to generate haptic feedback by generating a focused pressure point at or near skin on the hand of the user.

Example 13 includes an apparatus including a covering to be worn around at least a portion of a hand of a user and a plurality of ultrasonic arrays disposed on an inner surface of the covering. The plurality of ultrasonic arrays are to create focused pressure points at or near different sections of the hand of the user.

Example 14 includes the apparatus of Example 13, further including a control unit to selectively activate one or more of the plurality of ultrasonic arrays.

Example 15 includes the apparatus of any of Examples 13 or 14, further including a spacer coupled to the inner surface of the covering, the spacer to separate the covering from the hand of the user.

Example 16 includes a virtual reality system including a headset to be worn by a user, the headset having a visualization presenter to display a virtual reality environment to the user, and a glove to be worn on a hand of the user. The glove includes an ultrasonic array to generate a pressure on the hand of the user to simulate contact with an object in the virtual reality environment.

Example 17 includes the virtual reality system of Example 16, further including a haptic controller to determine a distance between a location of the object in the virtual reality environment and a location of the glove in the virtual reality environment.

Example 18 includes the virtual reality system of Example 17, wherein the glove includes an ultrasonic array actuator, the ultrasonic array actuator to activate the ultrasonic array based on an instruction from the haptic controller.

Example 19 includes the virtual reality system of Example 17, wherein the haptic controller is integrated into the glove.

Example 20 includes the virtual reality system of any of Examples 16-19, wherein the glove includes a transceiver to receive information about the virtual reality environment from the headset.

Example 21 includes a non-transitory machine readable storage medium including instructions that, when executed, cause a machine to at least determine a location of an object in a virtual reality environment, calculate a distance between a location of a section of a glove worn on a hand of a user and the location of the object in the virtual reality environment, and activate an ultrasonic array disposed inside of the glove when the distance is zero or substantially zero.

Example 22 includes the non-transitory machine readable storage medium of Example 21, wherein the instructions, when executed, further cause the machine to determine at least one of a frequency or an intensity at which to activate the ultrasonic array.

Example 23 includes the non-transitory machine readable storage medium of Example 21, wherein the instructions, when executed, further cause the machine to, prior to calculating the distance, determine the location of the section of the glove in the virtual reality environment.

Example 24 includes the non-transitory machine readable storage medium of Example 23, wherein the instructions, when executed, further cause the machine to determine the location of the glove based on image or video information from a camera.

Example 25 includes the non-transitory machine readable storage medium of Example 21, wherein the instructions, when executed, further cause the machine to recalculate the distance between the section of the glove and the location of the object and cease activation of the ultrasonic array if the recalculated distance has increased.

Example 26 includes the non-transitory machine readable storage medium of any of Examples 21-25, wherein the ultrasonic array is a first ultrasonic array, and wherein a plurality of ultrasonic arrays are disposed inside of the glove.

Example 27 includes the non-transitory machine readable storage medium of Example 26, wherein the instructions, when executed, further cause the machine to select multiple ones of the plurality of ultrasonic arrays to activate.

Example 28 includes an apparatus including means for determining a location of an object in a virtual reality environment, means for calculating a distance between a location of a section of a glove worn on a hand of a user and the location of the object in the virtual reality environment, and means for activating an ultrasonic array disposed inside of the glove when the distance is zero or substantially zero.

Example 29 includes the apparatus of Example 28, further including means for determining at least one of a frequency or an intensity at which to activate the ultrasonic array.

Example 30 includes the apparatus of Example 28, further including means for determining the location of the section of the glove in the virtual reality environment.

Example 31 includes the apparatus of Example 30, wherein the location of the glove is determined based on image or video information from a camera.

Example 32 includes the apparatus of Example 28, wherein the means for calculating is to recalculate the distance between the section of the glove and the location of the object, and the means for activating is to cease activation of the ultrasonic array if the recalculated distance has increased.

Example 33 includes the apparatus of any of Examples 28-32, wherein the ultrasonic array is a first ultrasonic array, and wherein a plurality of ultrasonic arrays are disposed inside of the glove.

Example 34 includes the apparatus of Example 33, further including means for selecting multiple ones of the plurality of ultrasonic arrays to activate.

Although certain example methods, apparatus, systems, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a glove to be worn on a hand of a user;
an array of ultrasonic generators on an inner surface of the glove; and
control circuitry to activate the ultrasonic generators to provide haptic feedback on the hand of the user, the ultrasonic generators, when activated, to generate sound waves in air, the sound waves respectively having repeating patterns of compressions and refractions, the ultrasonic generators arranged such that, when the ultrasonic generators are activated, the compressions of the sound waves interact at a distance from the ultrasonic generators to create a focused pressure point, the ultrasonic generators to be spaced from the hand of the user by the distance such that that the focused pressure point is created at or near skin on the hand of the user.

2. The apparatus of claim 1, further including a substrate, the ultrasonic generators on the substrate.

3. The apparatus of claim 2, wherein the ultrasonic generators are in a pattern of rows and columns on the substrate.

4. The apparatus of claim 2, where the substrate is curved.

5. The apparatus of claim 1, wherein the control circuitry is to activate the ultrasonic generators at substantially a same frequency.

6. The apparatus of claim 1, wherein the glove includes an outer layer and an inner layer, the inner layer to be in contact with the hand, the outer layer to be spaced apart from and surrounding the inner layer, the inner surface of the glove corresponding to an inner surface of the outer layer, and the ultrasonic generators coupled to the inner surface of the outer layer and facing the inner layer.

7. The apparatus of claim 6, wherein the glove includes a spacer between the inner layer and the outer layer to separate the outer layer from the inner layer.

8. The apparatus of claim 1, wherein the ultrasonic generators are in a finger section of the glove.

9. The apparatus of claim 1, wherein the control circuitry is coupled to the glove near a back side of the hand.

10. The apparatus of claim 1, wherein the array of the ultrasonic generators is one of a plurality of arrays on the inner surface of the glove, the plurality of arrays to generate haptic feedback on different sections of the hand.

11. A virtual reality system comprising:
a headset to be worn by a user, the headset having a screen to display a virtual reality environment to the user; and
a glove to be worn on a hand of the user, the glove including an ultrasonic array of ultrasonic generators to be spaced apart by a distance from skin on the hand of the user when the glove is worn by the user, when activated, the ultrasonic generators are to generate ultrasonic waves, respective ones of the waves having a corresponding repeating pattern of compressions and refractions, the ultrasonic generators arranged such that the compressions interact at the distance to collectively create a pressure on the hand of the user to simulate contact with an object in the virtual reality environment.

12. The virtual reality system of claim 11, further including a haptic controller to determine a distance between a location of the object in the virtual reality environment and a location of the glove in the virtual reality environment.

13. The virtual reality system of claim 12, wherein the glove includes an ultrasonic array actuator, the ultrasonic array actuator to activate the ultrasonic array based on an instruction from the haptic controller.

14. The virtual reality system of claim 12, wherein the haptic controller is integrated into the glove.

15. The virtual reality system of claim 11, wherein the glove includes a transceiver to receive information about the virtual reality environment from the headset.

16. A non-transitory machine readable storage medium comprising instructions that, when executed, cause a machine to at least:
determine a location of an object in a virtual reality environment;
calculate a distance between a location of a section of a glove worn on a hand of a user and the location of the object in the virtual reality environment; and
activate an array of ultrasonic generators inside the glove when the distance is zero or substantially zero, the ultrasonic generators are to, when activated, generate respective ultrasonic waves in air having repeating patterns of compressions and refractions, the compressions to interact to create a focused pressure point at or near skin on the hand of the user.

17. The non-transitory machine readable storage medium of claim 16, wherein the instructions, when executed, further cause the machine to, prior to calculating the distance, determine the location of the section of the glove in the virtual reality environment.

18. The non-transitory machine readable storage medium of claim 17, wherein the instructions, when executed, further cause the machine to determine the location of the glove based on image or video information from a camera.

19. The non-transitory machine readable storage medium of claim 16, wherein the instructions, when executed, further cause the machine to:
recalculate the distance between the section of the glove and the location of the object; and
cease activation of the array if the recalculated distance has increased.

20. The non-transitory machine readable storage medium of claim 16, wherein the instructions, when executed, further cause the machine to determine at least one of a frequency or an intensity at which to activate the array.

* * * * *